US009697971B2

United States Patent
Ko

(10) Patent No.: US 9,697,971 B2
(45) Date of Patent: Jul. 4, 2017

(54) APPARATUS FOR CONTROLLING SOLENOID VALVE AND CONTROL METHOD THEREOF

(71) Applicant: MANDO CORPORATION, Pyeongtaek-si (KR)

(72) Inventor: Soo-Hyun Ko, Suwon-Si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 116 days.

(21) Appl. No.: 14/716,773

(22) Filed: May 19, 2015

(65) Prior Publication Data

US 2015/0340183 A1    Nov. 26, 2015

(30) Foreign Application Priority Data

May 21, 2014    (KR) .................. 10-2014-0060649

(51) Int. Cl.
| | |
|---|---|
| *H01H 47/22* | (2006.01) |
| *F16K 31/06* | (2006.01) |
| *B60T 13/14* | (2006.01) |
| *B60T 13/66* | (2006.01) |
| *B60T 13/68* | (2006.01) |

(52) U.S. Cl.
CPC .......... *H01H 47/22* (2013.01); *B60T 13/146* (2013.01); *B60T 13/662* (2013.01); *B60T 13/686* (2013.01); *F16K 31/0675* (2013.01)

(58) Field of Classification Search
CPC ... H01H 47/22; F16K 31/0675; B60T 13/146; B60T 13/662; B60T 13/686
See application file for complete search history.

(56) References Cited

U.S. PATENT DOCUMENTS

| 2,588,413 | A | * | 3/1952 | Roschke | ............... H03B 19/12 327/116 |
|---|---|---|---|---|---|
| 5,404,301 | A | * | 4/1995 | Slicker | ................. F16D 48/066 192/3.3 |
| 5,640,322 | A | * | 6/1997 | McCafferty | ......... F16H 61/0251 192/222 |
| 7,853,360 | B2 | * | 12/2010 | | Kissler Fernandez ......... G05D 16/2013 700/275 |

FOREIGN PATENT DOCUMENTS

| JP | 4877529 | 12/2011 |
|---|---|---|
| KR | 10-2009-0071719 | 7/2009 |

* cited by examiner

*Primary Examiner* — Zeev V Kitov
(74) *Attorney, Agent, or Firm* — Ladas & Parry, LLP

(57) ABSTRACT

Disclosed herein are an apparatus for controlling a solenoid valve and a control method thereof. The apparatus for controlling the solenoid valve, which controls the solenoid valve including a solenoid coil, includes a switching part configured to switch a current supplied to the solenoid coil; a pre-driver configured to output a driving signal for driving the switching part; and a microcontroller unit (MCU) configured to control the pre-driver so that a frequency of the driving signal output from the pre-driver to the switching part is randomly varied.

8 Claims, 5 Drawing Sheets

APPARATUS FOR CONTROLLING SOLENOID VALVE AND CONTROL METHOD THEREOF

CROSS-REFERENCE TO RELATED APPLICATION

This application claims the benefit of Korean Patent Application No. 10-2014-0060649, filed on May 21, 2014 in the Korean Intellectual Property Office, the disclosure of which is incorporated in its entirety herein by reference.

BACKGROUND

1. Field

Embodiments of the present invention relate to an apparatus for controlling a solenoid valve and a control method thereof, and more particularly, to an apparatus for controlling a solenoid valve, which is capable of reducing an operation noise of the solenoid valve, and a control method thereof.

2. Description of the Related Art

In general, a solenoid valve is installed at each inlet and outlet side of four wheels in a vehicle having an electronically-controlled brake system, e.g., an anti-lock brake system (ABS).

In the ABS vehicle, when a braking force exceeds a friction force between a wheel of the vehicle and a road, and the vehicle starts to be slid, the solenoid valve of the corresponding wheel is operated to reduce a pressure thereof, and then when the vehicle starts to be driven again, the solenoid valve is operated to increase the pressure. Due to such an operation of the ABS, the vehicle is not slid, and is stably braked.

In the electronically-controlled brake system, the solenoid valve serves to supply a brake liquid pressure to a wheel cylinder or to cut off supply of the brake liquid pressure to the wheel cylinder.

The solenoid valve is opened and closed by a current supplied to a solenoid coil.

A conventional solenoid valve controlling device includes a shunt resistance part which detects the current flowing through the solenoid coil in the solenoid valve, a switching part which switches the current flowing through the solenoid coil, a pre-driver which outputs a driving signal to the switching part so as to switch on or off the switching part, and an electronic control unit (ECU) which monitors the current flowing through the solenoid coil using the shunt resistance part and controls the switching part through the pre-driver based on a monitoring result, such that a target current flows through the solenoid coil.

In the conventional solenoid valve controlling device, while the current flowing through the solenoid coil arrives at the target current, the ECU outputs the driving signal having a fixed frequency to the switching part through the pre-driver.

Therefore, an acoustic noise having the same frequency is generated at a solenoid valve assembly.

SUMMARY

Therefore, it is an aspect of the present invention to provide an apparatus for controlling a solenoid valve, which randomly varies a frequency of a driving signal output to a switching part, when a current of the solenoid valve is controlled, and thus reduces an acoustic noise of the solenoid valve, and a control method thereof.

Additional aspects of the invention will be set forth in part in the description which follows and, in part, will be obvious from the description, or may be learned by practice of the invention.

In accordance with one aspect of the present invention, an apparatus for controlling a solenoid valve, which controls the solenoid valve including a solenoid coil, includes a switching part configured to switch a current supplied to the solenoid coil; a pre-driver configured to output a driving signal for driving the switching part; and a microcontroller unit (MCU) configured to control the pre-driver so that a frequency of the driving signal output from the pre-driver to the switching part is randomly varied.

The MCU may control the pre-driver so that, while the driving signal is output from the pre-driver to the switching part, the frequency of the driving signal is randomly varied.

The apparatus may further include a current detecting part configured to detect a current flowing through the solenoid coil, wherein the pre-driver may include a proportional-integral (PI) controller configured to output the driving signal for controlling the switching part so that a current value which subtracts a current value detected through the current detecting part from a target current value input from the MCU is supplied to the solenoid coil, and a frequency shifter configured to randomly vary the frequency of the driving signal output to the switching part, while the driving signal is output from the PI controller to the switching part.

The MCU may control the frequency shifter so that the frequency of the driving signal is randomly varied according to a number of steps of the frequency of the driving signal subdivided into a predetermined number of steps, and a frequency variable range of the driving signal set to a predetermined frequency range.

In accordance with another aspect of the present invention, a method of controlling a solenoid valve which includes a solenoid coil, and is opened or closed by a current supplied to the solenoid coil so as to control a brake pressure supplied to a wheel cylinder, the method including, when the current of the solenoid valve is controlled, outputting a driving signal to a switching part configured to switch the current supplied to the solenoid coil so that the current flows through the solenoid coil; detecting the current flowing through the solenoid coil; and outputting the driving signal to the switching part for allowing the detected current value of the solenoid coil to arrive at a target current value, and randomly varying a frequency of the driving signal while the driving signal is output.

While the driving signal is output, the randomly varying of the frequency of the driving signal may randomly vary the frequency of the driving signal according to a number of steps of the frequency of the driving signal subdivided into a predetermined number of steps, and a frequency variable range of the driving signal set to a predetermined frequency range.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF MAIN ELEMENTS

Figure 1:
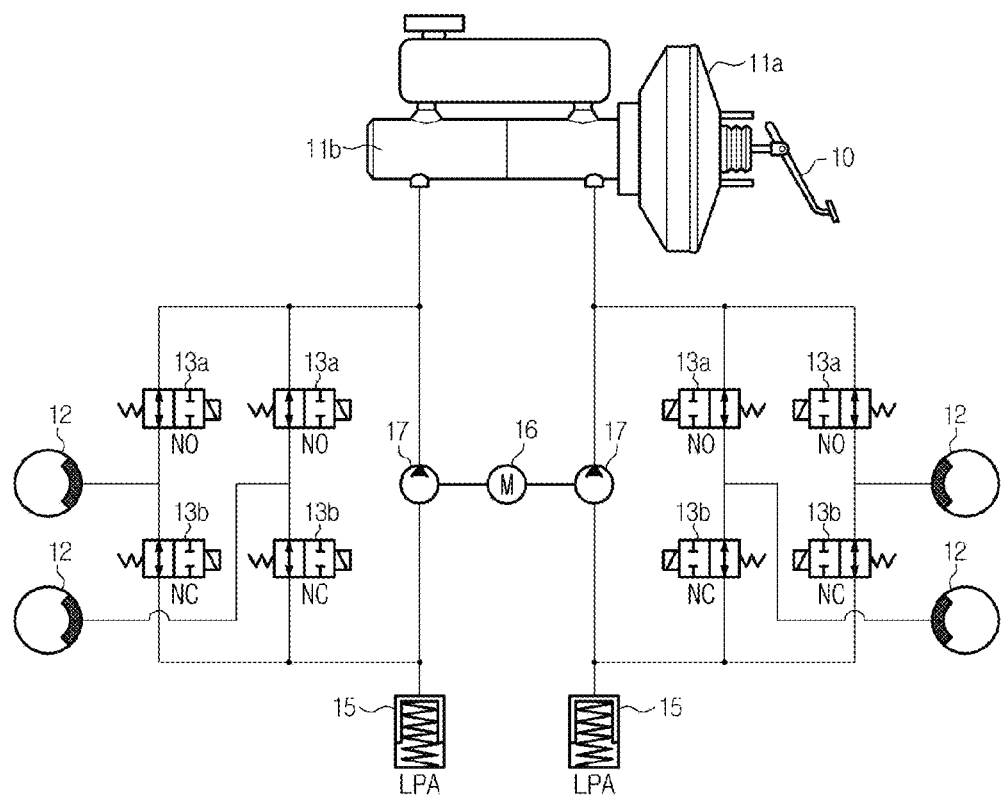
FIG. 1 is a hydraulic circuit diagram of an electronically-controlled brake system to which an apparatus for controlling a solenoid valve according to one embodiment of the present invention is applied.

13: solenoid valve
40: switching part
60: pre-driver
62: frequency shifter
71: frequency variable logic part
30: power source
50: current detecting part
61: PI controller
70: MCU

DETAILED DESCRIPTION

Hereinafter, exemplary embodiments of the present invention will be described in detail with reference to the accompanying drawings. The exemplary embodiments described below are provided as examples to sufficiently transfer the spirits of the invention to those skilled in the art. Accordingly, the present invention is not limited to those embodiments described below and can be embodied in different forms. In addition, in the drawings, explanatorily irrelevant portions are omitted to clearly describe the present invention, and the width, the length and the thickness of an element could be exaggerated for convenience. Throughout the disclosure, like reference numerals refer to like parts throughout the various figures and embodiments of the present invention.

FIG. 1 is a hydraulic circuit diagram of an electronically-controlled brake system to which an apparatus for controlling a solenoid valve according to one embodiment of the present invention is applied.

Referring to FIG. 1, the electronically-controlled brake system includes a brake pedal 10 which is operated by a driver when braking, and a booster 11a and a master cylinder 11b which amplify a force transmitted from the pedal 10 and generate a brake pressure.

Also, the electronically-controlled brake system further includes first and second solenoid valves 13a and 13b which supply a brake liquid pressure generated through the booster 11a to a wheel cylinder 12, a low pressure accumulator (LPA) 15 which temporarily stores a brake liquid discharged from the wheel cylinder 12, and a motor 16 and a pump 17 which pump and return the brake liquid stored in the LPA 15 to the master cylinder 11b or the wheel cylinder 12, and these elements are compactly installed at a modulator block.

The first and second solenoid valves 13a and 13b are respectively installed at inlet and outlet sides of the wheel cylinder 12 to introduce or discharge the brake liquid pressure generated from the master cylinder 11b and supplied to the wheel cylinder 12. The first solenoid valve 13a is a normally-opened (NO) valve which is opened in an off state, and the second solenoid valve 13b is a normally-closed (NC) valve which is closed in the off state.

When an anti-lock brake system (ABS) is operated, the first and second solenoid valves 13a and 13b are opened or closed, and thus the brake pressure in the wheel cylinder 12 is reduced, maintained or increased so as to brake a vehicle.

When the brake pressure is increased, the second solenoid valve 13b is closed, and the first solenoid valve 13a is opened, and thus the brake liquid pumped by the motor 16 and the pump 17 is supplied to the wheel cylinder 12.

Also, when the brake pressure is reduced, the first solenoid valve 13a is closed, and the second solenoid valve 13b is opened, and the brake liquid of the wheel cylinder 12 is discharged to the LPA 15, and thus the brake pressure of the wheel cylinder 12 is reduced.

Figure 2:
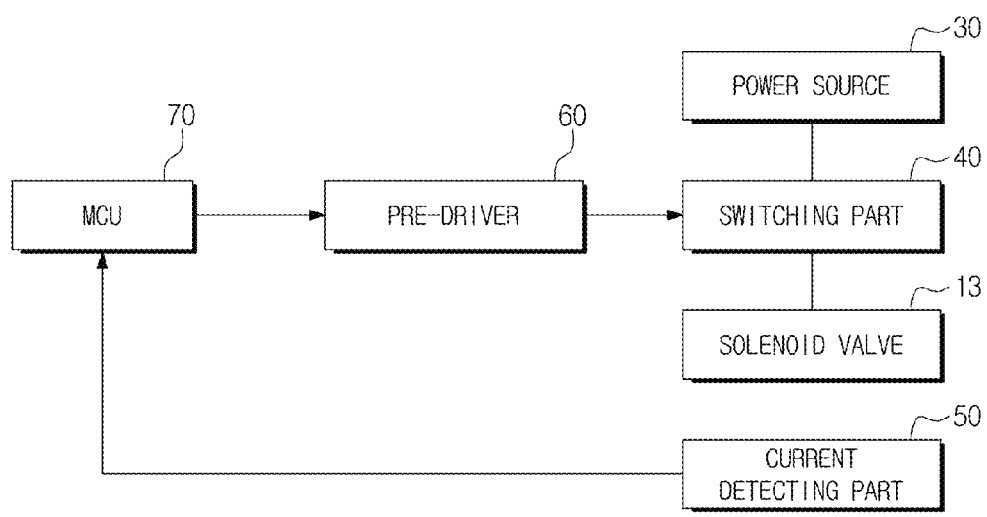
FIG. 2 is a schematic control block diagram of the apparatus for controlling the solenoid valve according to one embodiment of the present invention.
Figure 3:
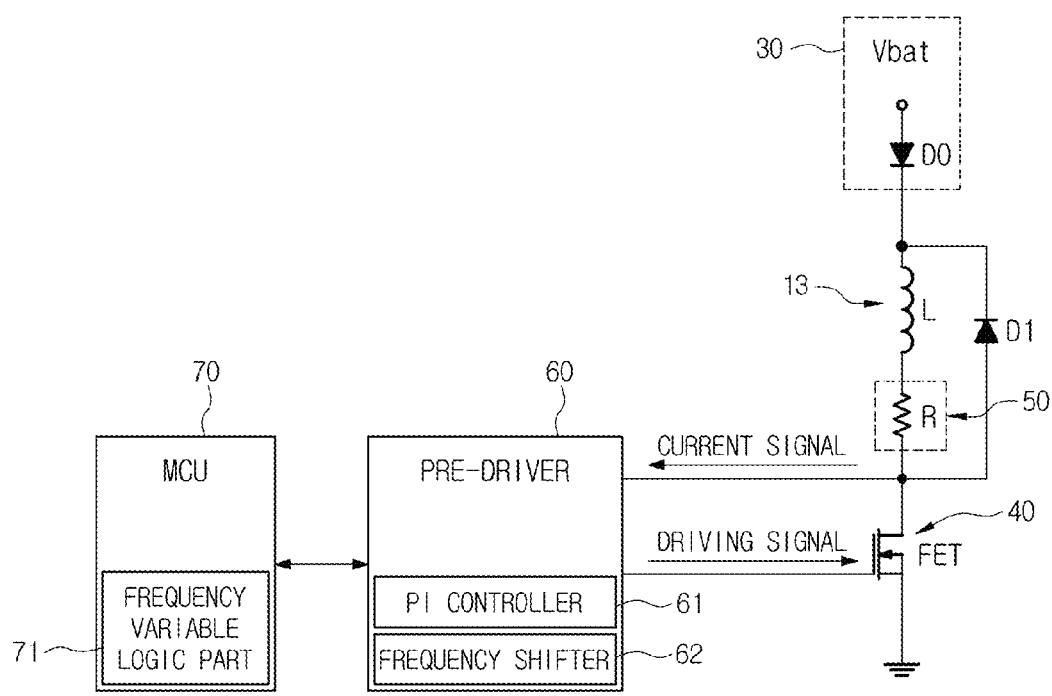
FIG. 3 is a schematic control circuit diagram of the apparatus for controlling the solenoid valve according to one embodiment of the present invention.

FIG. 2 is a schematic control block diagram of the apparatus for controlling the solenoid valve according to one embodiment of the present invention, and FIG. 3 is a schematic control circuit diagram of the apparatus for controlling the solenoid valve according to one embodiment of the present invention.

Referring to FIGS. 2 and 3, the apparatus for controlling the solenoid valve may include a power source 30, a switching part 40, a current detecting part 50, a pre-driver 60, and a microcontroller unit (MCU) 70.

An electronic control unit (ECU) which performs a general braking control of the vehicle includes the pre-driver 60 and the MCU 70.

The power source 30 includes a battery, and power is supplied from the battery to the solenoid valve 13.

The switching part 40 serves to switch a current supplied from the power source 30 to a solenoid coil L in the solenoid valve 13.

The current detecting part 50 detects the current supplied to the solenoid coil L. The current detecting part 50 may include a shunt resistor R connected to the solenoid coil L in series, and may detect a voltage applied to both ends of the shunt resistor R, and thus may detect the current supplied to the solenoid coil L. For reference, D1 is a freewheeling diode.

The pre-driver 60 outputs a driving signal for driving the switching part 40 according to a control signal of the MCU 70. The pre-driver 60 controls the switching part 40 through a proportional-integral (PI) control, such that a current value flowing through the solenoid coil L arrives at a target current value.

Also, the pre-driver 60 includes a proportional-integral (PI) controller 61 and a frequency shifter 62.

In general, a controller using a control technique in which a control signal is generated by multiplying an error signal as a difference between a command signal and a feedback signal by an appropriate proportional constant gain is called a proportional controller. The PI controller is a controller using a control technique in which an integral control producing the control signal by integrating the error signal is connected in parallel with a proportional control.

The PI controller 61 outputs the driving signal for controlling the switching part 40, so that that a current valve which subtracts the current value detected through the current detecting part 50 from the target current value input from the MCU 70 is supplied to the solenoid coil L.

The frequency shifter 62 varies a frequency of the driving signal output from the PI controller 61 to the switching part 40.

Figure 4:
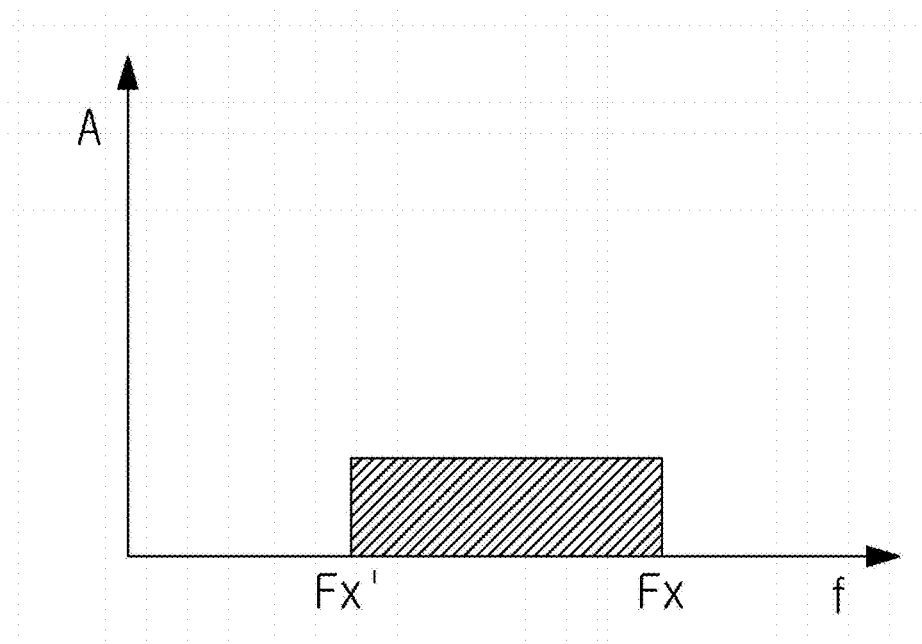
FIG. 4 is a graph illustrating a frequency variable range of a driving signal in the apparatus for controlling the solenoid valve according to one embodiment of the present invention.

FIG. 4 is a graph illustrating a frequency variable range of a driving signal in the apparatus for controlling the solenoid valve according to one embodiment of the present invention.

Referring to FIG. 4, the driving signal is a signal having a frequency which is randomly varied, instead of a fixed frequency.

A variable frequency range is a predetermined frequency range Fx' to Fx.

That is, when the current of the solenoid valve 13 is controlled, while the driving signal is output from the pre-driver 60 to the switching part 40 so that the current value detected through the current detecting part 50 arrives at the target current value, the frequency of the driving signal is randomly varied within the frequency range Fx' to Fx.

Referring to FIG. 3 again, the MCU 70 controls the frequency shifter 62 of the pre-driver 60, such that, when the current of the solenoid valve 13 is controlled, while the driving signal is output from the pre-driver 60 to the switching part 40 so that the current value detected through the current detecting part 50 arrives at the target current value, the frequency of the output driving signal is varied.

Therefore, the frequency of the driving signal output to the switching part 40 is not maintained constantly, but is changed as time goes on. Thus, an acoustic noise of the solenoid valve may be reduced.

The MCU 70 includes a frequency variable logic part 71 which varies the frequency of the driving signal through the frequency shifter 62 of the pre-driver 60.

The frequency variable logic part 71 controls so that, when the current of the solenoid valve 13 is controlled such that, while the driving signal is output from the pre-driver 60 to the switching part 40 so that the current value detected through the current detecting part 50 arrives at the target current value, the frequency of the driving signal output from the pre-driver 60 to the switching part 40 is randomly varied.

The frequency variable logic part 71 subdivides the number of steps of a frequency of the frequency shifter 62 of the pre-driver 60 into, e.g., 256 steps, and randomly varies the frequency variable range within a frequency variable range of e.g., 2 to 10 kHz (or 3 to 10 kHz).

Figure 5:
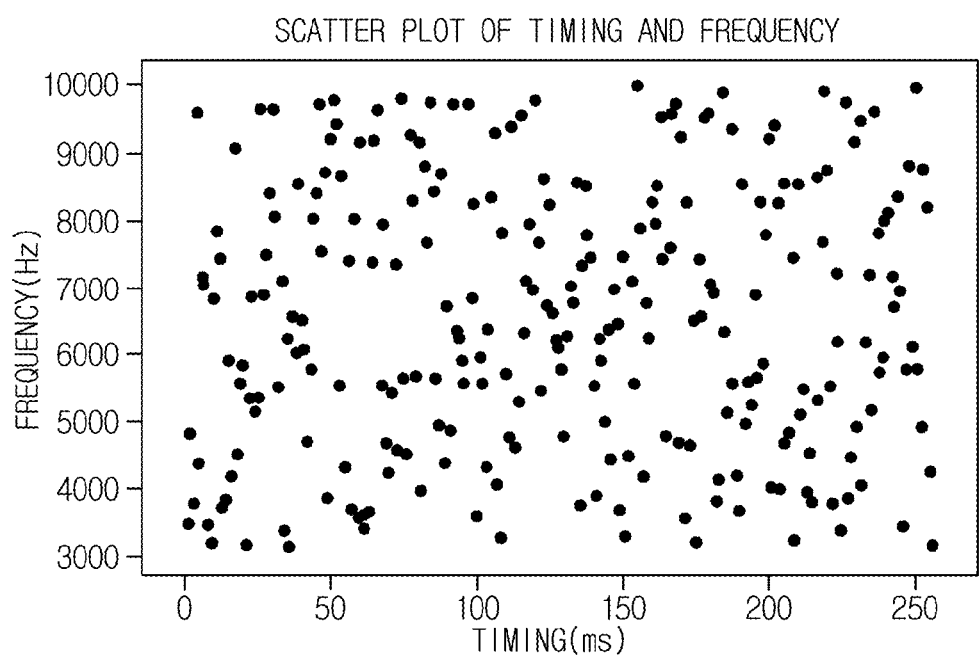
FIG. 5 is a graph illustrating a scatter plot of timing and a frequency of the driving signal in the apparatus for controlling the solenoid valve according to one embodiment of the present invention.

FIG. 5 is a graph illustrating a scatter plot of timing and the frequency of the driving signal in the apparatus for controlling the solenoid valve according to one embodiment of the present invention.

Referring to FIG. 5, in the scatter plot of the timing and the frequency of the driving signal, points indicating a frequency value and a timing value are indicated on a graph so as to show a relationship between the frequency and the timing. An X axis indicates the timing, and a Y axis indicates the frequency, and the points indicating the frequency and the timing are indicated so as to show the relationship between the frequency and the timing.

Assuming that the frequency of the driving signal is a value within a range of 3 to 10 kHz, and the timing is a value within a range of 0 to 250 ms, it may be understood that the scatter plot of the driving signal is randomly indicated, as the frequency of the driving signal is randomly varied. Therefore, the acoustic noise of the solenoid valve may be considerably reduced.

According to the present invention, while the current of the solenoid valve is controlled, when the switching part is controlled so that the current flowing through the solenoid coil arrives at the target current, the frequency of the driving signal output from the pre-driver to the switching part can be varied randomly, and thus the acoustic noise of the solenoid valve can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for controlling a solenoid valve, which controls the solenoid valve comprising a solenoid coil, comprising:
    a switching part configured to switch a current supplied to the solenoid coil;
    a current detecting part connected between the solenoid coil and the switching part and detecting a current flowing through the solenoid coil;
    a pre-driver configured to output a driving signal for driving the switching part; and
    a microcontroller unit (MCU) configured to control the pre-driver so that a frequency of the driving signal output from the pre-driver to the switching part is randomly varied while a current value of the solenoid coil detected by the current detecting part is approaching a target current value.

2. The apparatus according to claim 1, wherein the MCU controls the pre-driver so that, while the driving signal is output from the pre-driver to the switching part, the frequency of the driving signal is randomly varied.

3. The apparatus according to claim 1,
    wherein the pre-driver comprises a proportional-integral (PI) controller configured to output the driving signal for controlling the switching part so that a current value which subtracts the current value detected through the current detecting part from the target current value input from the MCU is supplied to the solenoid coil, and a frequency shifter configured to randomly vary the frequency of the driving signal output to the switching part, while the driving signal is output from the PI controller to the switching part.

4. The apparatus according to claim 3, wherein the MCU controls the frequency shifter so that the frequency of the driving signal is randomly varied according to a number of steps of the frequency of the driving signal subdivided into a predetermined number, and a frequency variable range of the driving signal set to a predetermined frequency range.

5. A method of controlling a solenoid valve which comprises a solenoid coil, and is opened or closed by a current supplied to the solenoid coil so as to control a brake pressure supplied to a wheel cylinder, the method comprising:
    when the current of the solenoid valve is controlled, outputting a driving signal to a switching part configured to switch the current supplied to the solenoid coil so that the current flows through the solenoid coil;
    detecting the current flowing through the solenoid coil; and
    outputting the driving signal to the switching part for allowing the detected current value of the solenoid coil to arrive at a target current value, and randomly varying a frequency of the driving signal while the detected current value of the solenoid coil is approaching the target current value,
    wherein the detecting the current flowing through the solenoid coil detects the current flowing using a current detecting part connected between the solenoid coil and the switching part.

6. The method according to claim 5, wherein, while the driving signal is output, the randomly varying of the frequency of the driving signal randomly varies the frequency of the driving signal according to a number of steps of the frequency of the driving signal subdivided into a predetermined number, and a frequency variable range of the driving signal set to a predetermined frequency range.

7. The apparatus of claim 1, wherein the pre-driver is configured to randomly vary the frequency of the driving signal controlling the current flowing through the solenoid coil so that the detected current value of the solenoid coil meets the target current value.

8. The method of claim 5, wherein the outputting the driving signal comprises randomly varying the frequency of the driving signal controlling the current flowing through the solenoid coil so that the detected current value of the solenoid coil meets the target current value.

* * * * *